LADING TIE ANCHORING MEANS AND APPLICATION

Original Filed Dec. 7, 1951 4 Sheets-Sheet 1

INVENTOR.
Malcolm S. Johnson
BY George Heidemann
Att'y

LADING TIE ANCHORING MEANS AND APPLICATION

Original Filed Dec. 7, 1951 4 Sheets-Sheet 2

INVENTOR.
Malcolm S. Johnson
BY George Heidman
Atty.

LADING TIE ANCHORING MEANS AND APPLICATION

Original Filed Dec. 7, 1951 4 Sheets-Sheet 3

INVENTOR.
Malcolm S. Johnson
BY Roger Heidman
Atty.

LADING TIE ANCHORING MEANS AND APPLICATION

Original Filed Dec. 7, 1951 4 Sheets-Sheet 4

INVENTOR.
Malcolm S. Johnson
BY George Heidman.
Atty.

United States Patent Office

Re. 24,032
Reissued July 5, 1955

24,032

LADING TIE ANCHORING MEANS AND APPLICATION

Malcolm S. Johnson, Flossmoor, Ill., assignor to Illinois Railway Equipment Company, Chicago, Ill., a corporation of Illinois Original No. 2,660,130, dated November 24, 1953, Serial No. 260,430, December 7, 1951. Application for reissue December 10, 1954, Serial No. 474,637

11 Claims. (Cl. 105—369)

Matter enclosed in heavy brackets [ ] appears in the original patent but forms no part of this reissue specification; matter printed in italics indicates the additions made by reissue.

My invention relates to means for readily anchoring the lading-holding ties in railroad house or box cars whereby undesirable shifting of the lading during transit is prevented; the anchoring means being such that it forms a fixed or permanent part of the car inner wall, thus permitting repeated use—but when not in use will not interfere with the shipment of nor cause injury to other commodities.

The object of the invention is to provide means that will eliminate the use of cleats and nailing of the tie elements to the car lining which results in car lining injury and destruction when the fastening means are removed to release the commodity.

The anchor is also designed to reduce the cost of application to the car wall or lining as compared with present types of anchoring means and to also provide increased strength to the car side lining and anchor in its securement to the car, as well as to reduce manufacturing cost.

The aforementioned objects and advantages of my improved anchoring means, as well as other advantages inherent in the invention will all be readily comprehended from the detailed description of the exemplification shown in the accompanying drawings wherein.

Figure 2:
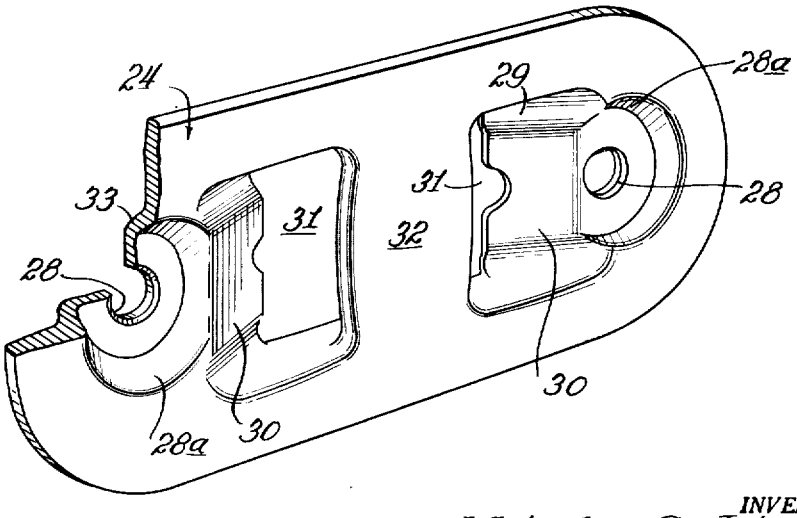
Figure 2 is a perspective view of the outer or face plate, with a portion broken away and in section.
Figure 5:
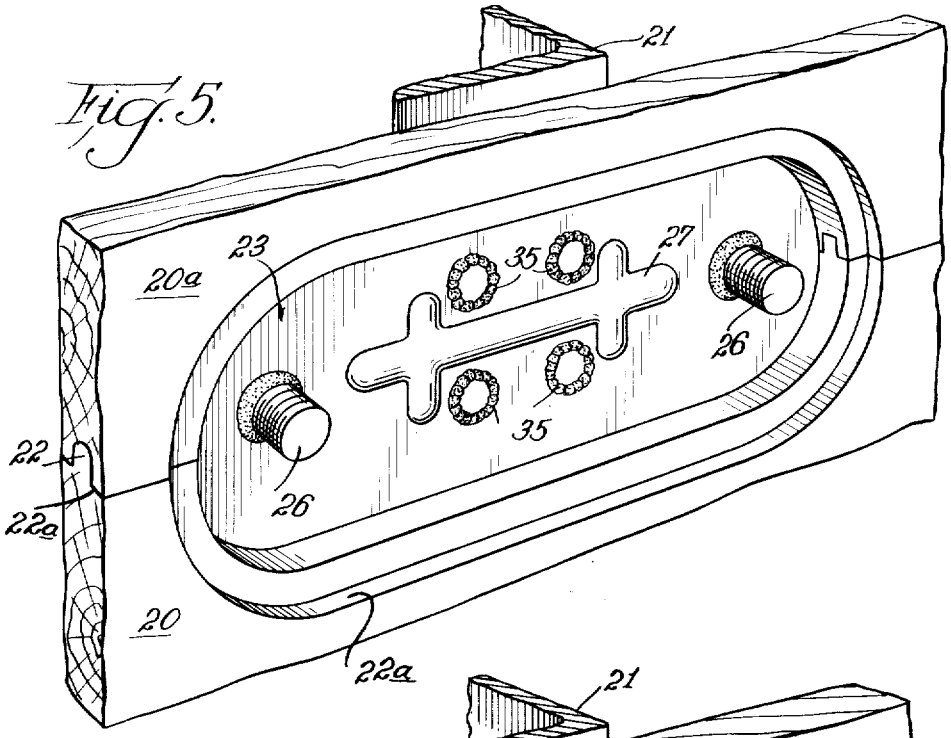
Figure 5 is a perspective view showing a portion of the adjacent matching lining board in place and the retainer member or base plate of my improved anchor secured to the structural member of the car.
Figure 6:
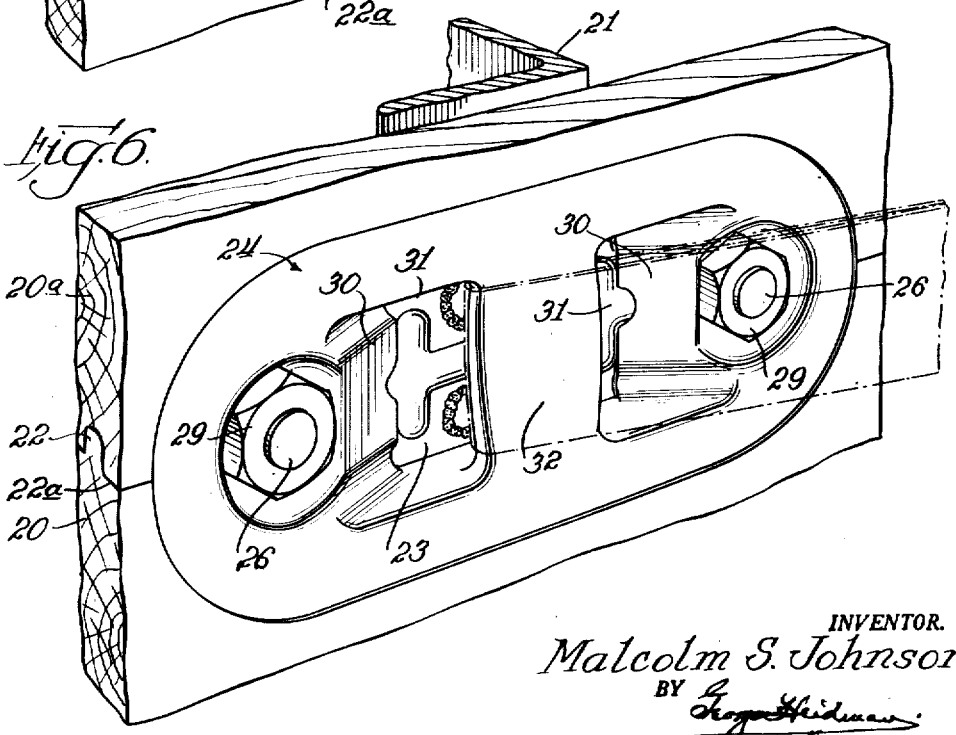

Figure 6, a perspective view, shows the outer or face plate of Figure 2 in place and secured to the base plate or retainer member disclosed in Figure 5 and a portion of a tie strap shown in dotted lines.

Figure 7:
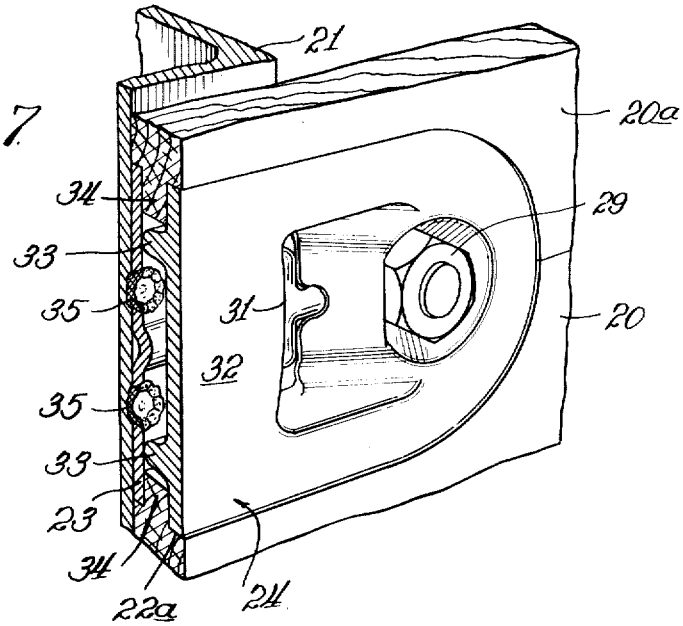

Figure 7 is a sectional view taken substantially at the vertical center line of the assembled anchor shown in Figure 6.

Figure 3:
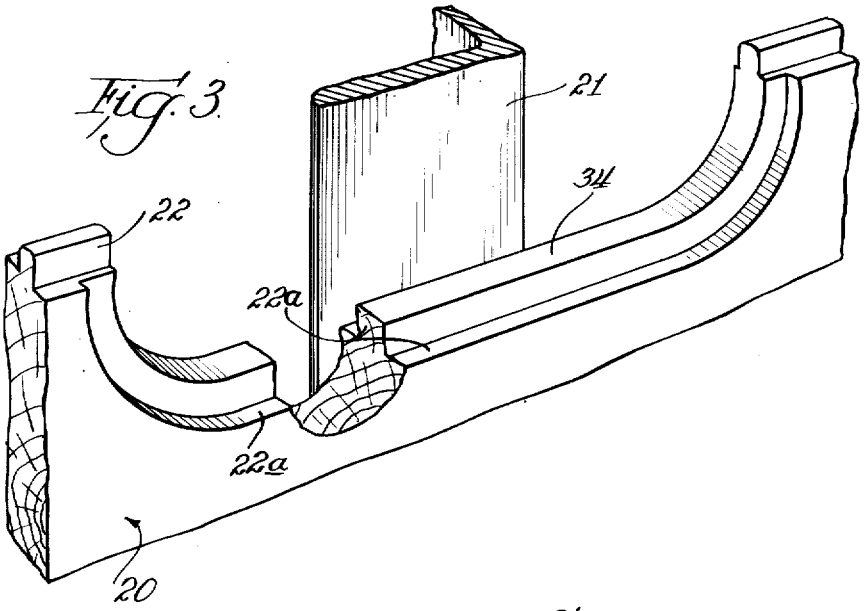
Figure 3 is a perspective view of a portion or one board of the car lining or inner sheathing cut-out or arranged to receive my improved anchor and disclosing a portion of the steel member of the car superstructure.
Figure 8:
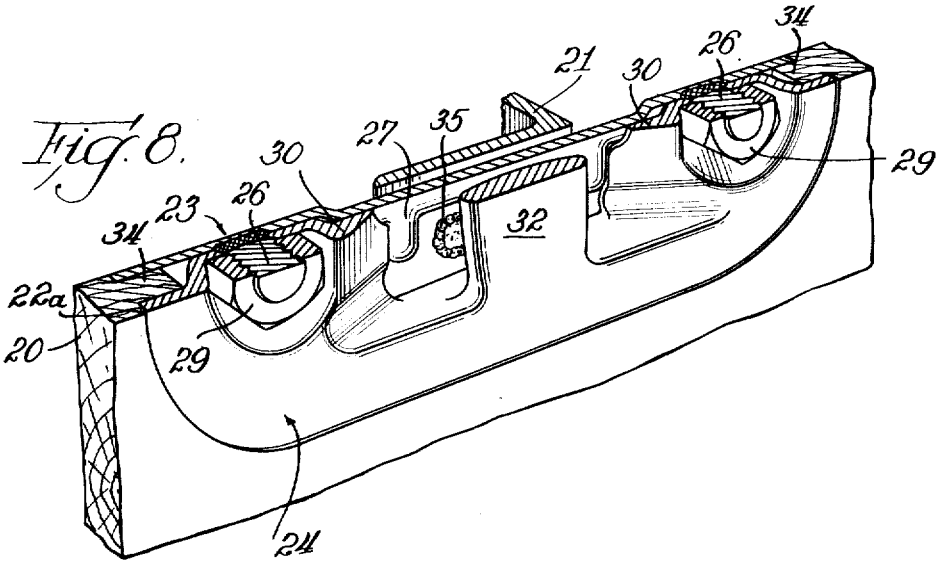

Figure 8 is a sectional view taken on the horizontal center line of the anchor shown in Figure 3.

The exemplification of my improved anchor, as shown in the drawings, is of oblong shape and is imbedded or set into the car lining which generally consists of tongue-and-grooved boards 20, 20a extending lengthwise of the car. The lining boards preferably before application, at their longitudinal tongue-and-groove edges, are provided at the mills with oblong cut-outs extending lengthwise of the boards and at preselected places coincident with the metal uprights or posts of the car superstructure, as shown at 21 in Figure 3; one-half of the cut-outs being made in the tongued lining boards 20, while the other half of the cut-out is made at the grooved edge of the board 20a.

Figure 4:
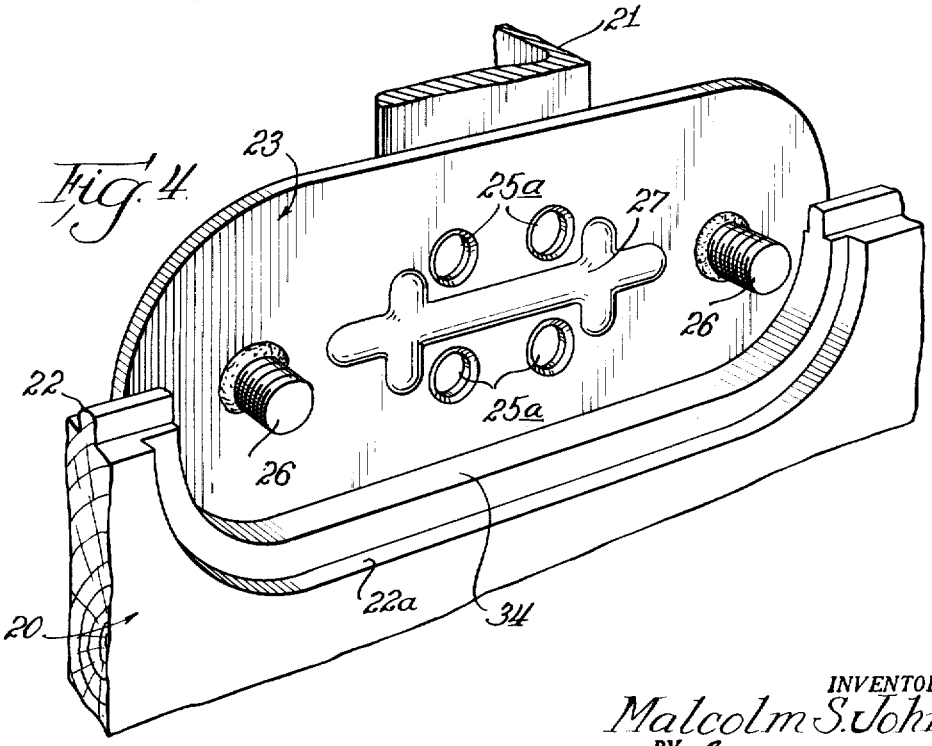
Figure 4 is a perspective view showing the base or retainer member of Figure 1 arranged between the upright post of the car superstructure and the cut-out, as shown in Figure 3, of the lining board.

The perimeters of the cut-outs are preferably gained or shouldered to provide an intermediate shoulder as at 22; the gains being of sufficient depth to receive the steel base or retainer plate 23, intermediate the structural car post 21 and the body of the lining boards 20, 20a; while the gains at the forward or outer face of the lining boards is adapted to receive the face plate 24 (see Figures 4, 5 and 6).

The base member or retainer plate 23, preferably of pressed steel, is shown provided with a suitable number of predeterminedly located holes 25 (adapted to register with the steel post 21 of the car frame), adjacent the vertical and horizontal median lines of the plate; and the plate, preferably before application, at its horizontal median line and on opposite sides of the vertical median line is provided with the threaded studs 26 preferably machine welded to the plate 23. The plate 23 is shown as preferably provided with a suitable embossed rigidifying and guiding rib as at 27, arranged intermediate the upper and lower set of holes 25, and the studs 26, see Figure 4.

The inner or car side of the anchoring means consists of the face plate 24 which is a one-piece element which preferably may be a casting. By reason of its design it may be a casting made in green sand, eliminating the use of dry sand cores, thereby reducing the cost of manufacture. The casting, similar to the retainer plate, is of oblong shape with its major axis extending through the stud-receiving holes 28; and the face plate 24, surrounding the stud-receiving holes 28 is recessed to receive and permit manipulation of the nuts 29, 29 whereby the face plate 24 is clamped to the retainer member or plate 23.

The face plate 24, intermediate the minor or vertical axis and the recessed stud-receiving holes 28, is provided with recesses and the inclining surfaces 30, which terminate in openings 31 through to the opposite side of the plate on opposite sides of the vertically extending fastening strap or element-holding bar 32 which is arranged flush with the body of the plate, and preferably provided with somewhat rounded or band non-cutting edges as shown in Figure 2. With the openings 31 extending entirely through to the retainer plate, a strap or tie element-receiving channel between the plates is provided whose ends of ingress and/or egress are formed by the sloping or inwardly slanting surfaces 30, 30.

The rear side of the face plate, integral with the declining surfaces 30, 30 and above and below the openings 31, and integral with the ends at the rear of the bar 32, is provided with the longitudinally extending ribs 33, 33 which are adapted to extend flush with the retainer plate or member 23, above and below the weld openings 25. These ribs not only strengthen the face plate 24, but also seal the cavity intermediate the retainer plate and the face plate against the ingress or sifting of grain or other granular commodity with which the car may at times be loaded. In other words, these ribs seal the car interior against ingress or communication from the car exterior.

The face plate 24 at the stud-receiving holes 28 is preferably provided with boss-like portions at 28a which may spread or flow into the inclining surfaces 30 and thereby increase the strength of the plate.

Figure 1:
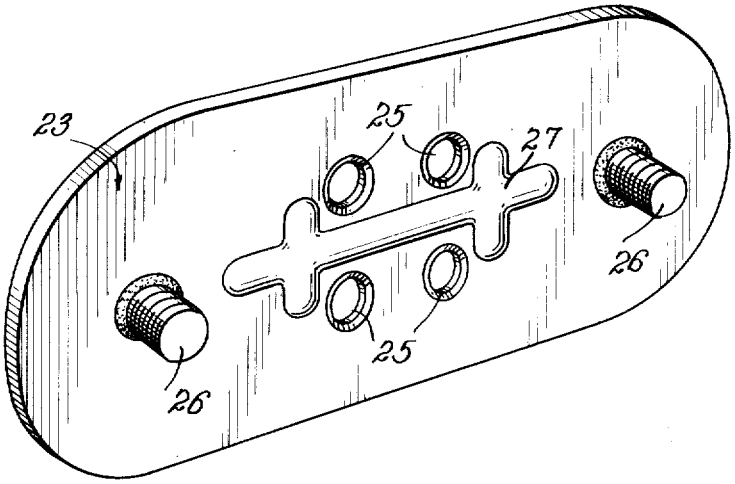
Figure 1 is a perspective view of the base member or retainer plate of my improved anchoring means.
Figure 1A:
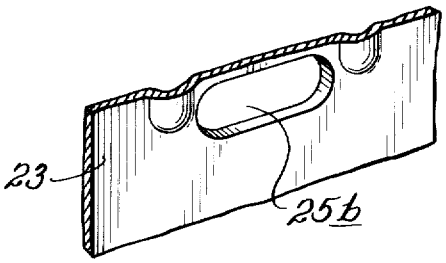
Figure 1A is a perspective view of an intermediate portion of the base or retainer plate shown in Figure 1, disclosing a modification.

The holes 25 in the retainer plate 23 are adapted to receive studs for machine plug welding of the plate to the car steel superstructure or post 21, as indicated at 25a in Figure 4; or the plate 23 instead of the holes 25 may be provided with slots as at 25b (see Figure 1A) when it is to be secured to the steel post by hand electric arc welding.

In order to reduce cost of application, the wood lining cut-outs and gains previously mentioned and shown in Figures 3 to 8 preferably are made at the mill; namely with the gains made on both sides of the lining boards and circumscribing the cut-out opening in the boards at their matching edges; with the gains of prescribed depth commensurate with the more or less standard thickness of the boards and hence of a depth less than the transverse dimensions of the usual tongue-and-grooves of the boards, but of depth sufficient to receive the retainer and fact plates to permit them to lie flush with the opposite sides of the boards.

With the cut-outs extending lengthwise of the boards, a major portion of the boards is left intact and with the oblong plates in place extending into the gains or onto the shoulders beyond the main cut-out, the lining boards are greatly reenforced and the lining provided with a firm backing and support for the face plate. By gaining both sides of the board as shown and described, the inner perimeter of the cut-out is provided interiorly with a comparatively thick circumscribing tongue 34 (see Figures 3 and 4) commensurate with the walls of the sloping surfaces 30, 30 and ribs 33, thus enabling a firm clamping condition of the adjacent portions of the lining boards between the retainer plate and the face plate.

The rib 27, with its radiating portions, not only provides added strength, but also guides and maintains the inserted end of the lading tie strap or element above and out of contact with the slight upheaval of metal at the welds 35 (see Figure 5); while the sloping walls 30 and side walls about the openings 31 in the face plate 24 will guide the retaining or tie element (shown in dotted lines in Figure 6) about the tie bar 32.

The cut-outs and gains in the preselected boards and at predetermined locations preferably are accomplished, through the use of a proper template, at the mills which tends toward reduction in cost of application, while the construction of my tie fastening means, per se, not only increases the strength of the car lining, but also simplifies its application and provides a rigid fastening means integrally united with the car metal superstructure, which prevents the possibility of grain or other foreign substance sifting into or rearward of the car lining, while at the same time enabling the removal and replacement of the lining, when occasion requires, to be readily made without dislocating or disturbing the rigidly fastened base or retainer plate.

My invention is designed to overcome the difficulties and shortcomings of methods at present in use wherein the ends of the steel bands employed for fastening the lading or crates to the card side walls or lining boards are secured to the car lining by means of a plate or cleat nailed to the lining with the steel band bent or wrapped around the cleat. Due to the severe shocks encountered during transit, these bands or the cleats frequently tear loose, allowing the load to shift and to become damaged. Then, too, in order to remove the cleats or plate with attached portions of the tie bands for a subsequent loading of the car, the removal of the cleats and portions of attached bands is accomplished by the use of a crowbar or tool of similar nature, which results in maceration or damage of the car lining making it unsuitable for subsequent nailing or fastening of the tie elements or bands during reloading of the car. Such damage to the lining necessitates costly replacements of the lining, as splintered or broken lining causes costly lading damage claims.

Various methods to overcome these difficulties have been proposed, such as the permanent fastening of the anchor to the steel uprights of the car and then hand fitting the wood lining about the previously installed anchor—or by routing recesses in the existing side lining—but both methods involve considerable time and labor and hence considerable expense. Then too, most of these methods or designs result in the lining boards being practically or entirely cut in two, thereby weakening the lining and making the lining boards susceptible to deflection and breakage by surging grain, whether in bulk or bag.

To overcome these difficulties and objections, I have devised the more or less simple anchor and method of application, which permits use of either bands or wires for firmly anchoring the lading in place against the severe car end shocks encountered in transit. In order to eliminate the excessive labor cost entailed by hand fitting the wood lining around the previously installed anchors or by routing recesses in the previously installed lining, the preselected lining boards are prepared at the wood mill. The cost of labor today causes certain devices to be prohibitive.

By preparing the lining at the wood mill before installation through the use of a proper template, a considerable reduction in expense is accomplished and less than fifty percent of the meeting edges of adjacent or matching lining boards is removed and a continuous tongue-like portion of the adjacent boards left intact which is adapted to fit between the marginal portions of the base plate and face plate and thereby firmly clamped therebetween, with the result that the car lining at the points of anchor location is reenforced by the metallic anchor, both of whose plates fit into the gained outer perimeters of the oblong slots or cut-outs when the two plates are firmly clamped together by screwing up the nuts on the threaded studs thereby clamping the uncut portions adjacent the cut-outs therebetween.

In view of possible variations in board thickness, the tongue-and-groove lining boards while at the wood mill are first matched and then by use of a suitable template are cut or slotted as previously stated, with approximately one-half of the cut-out in each board and gained to provide the continuous tongue-like portion 34 circumscribing the inner perimeter of the cut-out to receive the marginal portions of the plates, as shown in Figures 4 and 8, permitting the body of both plates, especially the outer or face plate, to lie flush with the faces of the board. The cut-outs in the boards, whether lining or floor boards, are arranged to register with the structural beams or posts of the car frame. The matching boards are then put into place with the base plate seated in the cut-out and intermediate the beams or posts which hold the plate loosely in place.

With the base plate unattached to the car post 21, the lining boards may be jacked into position either upwardly or horizontally into snug relation and with the ends fitting snugly against the car door post or car framing; the base plate 23, being allowed to float with the boards the required degree.

After the boards (with the loose floating base plates) have been forced into snug relation as before described, the boards are nailed in place and the base plates are then welded, or otherwise properly secured, to the car frame posts or beams and the face plates applied and secured to the studs or forward projections of the base plates. When the face plates are securely fastened in place it is apparent that their overlapping relation with the tongue-like portions 34 will firmly hold the boards in place.

It is apparent that where the car framing consists of wood instead of metal, the anchor would be secured by means of suitable screws or bolts and that the anchors may be secured in similar manner in the car wood floor.

This structure and method of arrangement herein described, overcomes the excessive labor and time involved with a fixed and previously applied retainer plate; and enables the lining boards with the loosely held anchor to be positioned and then welded or otherwise fixedly secured, to the car frame posts, after the boards have been nailed in place.

Although my improved anchor has been described in connection with the lining boards of a car where most of the anchoring is done, it is apparent that the anchor and same method of application would be employed in instances where the anchoring of lading to the car floor is desired, and while I have described what I believe to be the best embodiment of the invention and method of application, certain modifications are possible and may be made without departing from the spirit of the invention as defined in the appended claims.

What I claim is:

1. A lading tie anchor comprising a substantially flat metallic retainer plate provided with longitudinally spaced, intimately secured, forwardly presented studs; means whereby the plate is intimately secured to the metal posts of a railroad car superstructure; a metallic face plate matching and coextensive with the retainer plate and provided at opposite sides of its vertical median portion and spaced therefrom with partially severed portions and the partially severed metal dished rearwardly toward the retainer plate, the integral portion of the face plate intermediate said spaced apart rearwardly dished portions constituting a wide tie element holding bar, the face plate on its rear side and intermediate the dished portions and the perimeter of the plate having retainer plate contacting surfaces for maintaining a spaced relation between the plates and to enclose the tie element receiving cavity above and beneath said dished surfaces, and means whereby the two plates are secured together.

2. A lading tie anchor for railroad house cars provided with inner lining boards and metal superstructural posts, the boards being provided at preselected places with cut-out openings gained to provide a perimetrical rib between opposite sides of the board said anchor comprising a substantially flat-surfaced metal base plate provided with prearranged openings registering with said structural posts to permit welding the plate to said posts and provided with forwardly disposed longitudinally spaced studs; an outer face plate coextensive with said first plate, provided with vertical slits spaced intermediate said studs, with the metal approaching the slits from the ends of the plate being dished rearwardly, said slits and dishings being spaced to provide a tie element holding bar-like portion therebetween, the plate having openings to receive said studs; circumscribing surfaces about said slits and dished surfaces between the plates to space the plates and provide a tie element receiving cavity; and means cooperating with said studs whereby the face plate is removably secured in place and the perimetrical ribs of the lining boards clamped between the marginal portions of the plates and the lining boards held against outward pressure.

3. A lading tie anchor for railroad house cars having an inner lining comprising a metal retainer plate formed to permit intimate securement to the posts of the car and to be disposed to the rear of the car lining; a metal face plate coextensive with the retainer plate provided with tie element receiving openings communicating with the space between the two plates, said openings being spaced apart to provide a tie element holding bar therebetween; means whereby the plates are held spaced apart to provide a tie element receiving channel therebetween, said means being spaced from the perimeters of the plates to provide a lining board receiving perimetrical groove about the anchor; and means whereby the face plate is secured to the retainer plate.

*4. A lading tie anchor adapted to be intimately secured to a metallic structural post of a railroad car superstructure, comprising an anchor provided on its forward face with a cavity, openings in the forward face communicating with said cavity to receive a lading tie element and an integral tie holding bar-like portion between said openings extending across and intermediate the ends of the cavity to permit a tie holding element to pass therebeneath; the body portion having means associated therewith whereby the anchor may be secured to a structural post of the car, while the edges of the anchor are formed to provide means for holding the lining boards against pressure movement of the car lading.*

*5. In a lading tie anchor adapted to be secured to a structural post of a railroad car superstructure, the combination of the car inner lining provided with cut-outs at the longitudinal edges of adjacent boards and said cut-outs formed to provide circumscribing tongues; an anchor composed of a rear plate-like portion and a forward plate-like portion intimately secured together so as to provide a tie element receiving passage therebetween with openings in the forward plate-like portion communicating with said passage, said openings being spaced to provide a tie element holding portion therebetween, the edges of the anchor being formed to effect interengaging relation with said circumscribing tongues, the anchor being formed for attachment to the car structural post.*

*6. A lading tie anchor for railroad house cars having an inner lining, comprising a unitary structure composed of a rear plate-like portion and a forward plate-like portion, means whereby said portions are maintained and secured together to provide a tie element receiving passage therebetween, the forward plate-like portion having openings communicating with said passage and said openings being spaced to provide a tie element holding portion disposed over said passage, means at the marginal portion of the anchor for supporting the adjacent edges of the car lining, the anchor being formed for attachment to the car structural posts.*

*7. A lading tie anchor adapted to be intimately secured to a metallic structural post of a railroad car superstructure, comprising an anchor provided on its forward face with a cavity, openings in the forward face communicating with said cavity to receive a lading tie element and an integral tie holding bar-like portion between said openings extending over the cavity to permit a tie holding element to pass therebeneath; the body portion having means associated therewith whereby the anchor may be secured to a structural post of the car, while at least one end portion of the anchor is formed to provide means for holding that portion of the lining boards in endwise alignment therewith against pressure movement of the car lading.*

*8. A lading tie anchor adapted to be intimately secured to a metallic structural post of a railroad car superstructure, comprising an anchor provided on its forward face with a cavity, openings in the forward face communicating with said cavity to receive a lading tie element and an integral tie holding bar-like portion between said openings extending over the cavity to permit a tie holding element to pass therebeneath; the body portion having means associated therewith whereby the anchor can be secured to a structural post of the car and laterally extending flange and groove means for interfitting with portions of juxtaposed lining boards.*

*9. A lading tie anchor adapted to be intimately secured to a metallic structural post of a railroad car superstructure, comprising an anchor provided on its forward face with a cavity, openings in the forward face communicating with said cavity to receive a lading tie element and an integral tie holding bar-like portion between said openings extending over the cavity to permit a tie holding element to pass therebeneath; the body portion having means associated therewith whereby the anchor can be secured to a structural post of the car and laterally extending flange and groove means along its upper and lower edges for interfitting with laterally extending portions of juxtaposed lining boards.*

*10. A lading tie anchor adapted to be intimately secured to a metallic structural post of a railroad car superstructure, comprising an anchor provided on its forward*

*face with a cavity, openings in the forward face communicating with said cavity to receive a lading tie element and an integral tie holding bar-like portion between said openings extending over the cavity to permit a tie holding element to pass therebeneath; the body portion having means associated therewith whereby the anchor can be secured to a structural post of the car and laterally extending flange and groove means along its upper and lower edges for interfitting with laterally extending portions of the juxtaposed lining boards, while at least one end portion of the anchor is formed to provide means for holding that portion of the lining boards in endwise alignment therewith against pressure movement of the car lading.*

*11. A lading tie anchor adapted to be intimately secured to a metallic structural post of a railroad car superstructure, comprising an anchor provided on its forward face with a cavity, openings in the forward face communicating with said cavity to receive a lading tie element and an integral tie holding bar-like portion between*

*said openings extending over the cavity to permit a tie holding element to pass therebeneath; the body portion having means associated therewith whereby the anchor can be secured to a structural post of the car and laterally extending flange and groove means along its upper and lower edges for interfitting with laterally extending portions of the juxtaposed lining boards, while the end portions of the anchor are formed to provide means for holding those portions of the lining boards in endwise alignment therewith against pressure movement of the car lading.*

References Cited in the file of this patent or the original patent

UNITED STATES PATENTS

| | | |
|---|---|---|
| 2,028,574 | Tobin | Jan. 21, 1936 |
| 2,601,103 | Dietrichson | June 17, 1952 |
| 2,605,719 | Smith et al. | Aug. 5, 1952 |
| 2,605,721 | Johnson et al. | Aug. 5, 1952 |